(12) United States Patent
Van Vlassenrode (10) Patent No.: US 11,975,523 B2
(45) Date of Patent: *May 7, 2024

(54) FLOOR PANEL AND METHOD FOR MANUFACTURING A FLOOR PANEL

(71) Applicant: FLOORING INDUSTRIES LIMITED, SARL, Bertrange (LU)

(72) Inventor: Kristof Van Vlassenrode, Deinze (BE)

(73) Assignee: UNILIN BV, Wielsbeke (BE)

(*) Notice: Subject to any disclaimer, the term of this patent is extended or adjusted under 35 U.S.C. 154(b) by 0 days.

This patent is subject to a terminal disclaimer.

(21) Appl. No.: 18/147,206

(22) Filed: Dec. 28, 2022

(65) Prior Publication Data

US 2023/0134244 A1 May 4, 2023

Related U.S. Application Data

(63) Continuation of application No. 16/972,063, filed as application No. PCT/IB2019/053816 on May 9, 2019, now Pat. No. 11,565,501.

(30) Foreign Application Priority Data

Jun. 6, 2018 (BE) .................................. 2018/5376

(51) Int. Cl.
*B32B 1/00* (2006.01)
*B32B 3/06* (2006.01)
(Continued)

(52) U.S. Cl.
CPC ................ *B32B 7/023* (2019.01); *B32B 3/06* (2013.01); *B32B 3/263* (2013.01); *B32B 5/022* (2013.01);
(Continued)

(58) Field of Classification Search
CPC .......... E04F 15/02033; E04F 15/02038; E04F 15/107; E04F 15/102; E04F 2201/042;
(Continued)

(56) References Cited

U.S. PATENT DOCUMENTS 5,342,666 A 8/1994 Ellison et al.
8,549,807 B2 * 10/2013 Meersseman ......... E04F 15/107
52/DIG. 9
(Continued)

FOREIGN PATENT DOCUMENTS

DE 102010047137 A1 4/2012
WO 9747834 12/1997
(Continued)

OTHER PUBLICATIONS

Search Report from corresponding PCT Application No. PCT/IB2019/053816, dated Aug. 7, 2019.

*Primary Examiner* — Chi Q Nguyen
(74) *Attorney, Agent, or Firm* — Workman Nydegger (57) ABSTRACT

A floor panel including at least one substrate and a top layer, where the substrate includes at least one first layer of a first thermoplastic material and a second layer of a second thermoplastic material. The second layer is adjacent to a first side of the first layer and the second layer provides the floor panel with its underside. The first layer is characterized by a first colour with saturation value S1 in the HSL colour space and the second layer is characterized by a second colour with saturation value S2 in the HSL colour space, where S1 is less than S2.

21 Claims, 2 Drawing Sheets

(51) Int. Cl.
*B32B 3/26* (2006.01)
*B32B 5/02* (2006.01)
*B32B 5/18* (2006.01)
*B32B 5/24* (2006.01)
*B32B 7/023* (2019.01)
*B32B 27/12* (2006.01)
*B32B 27/30* (2006.01)
*E04F 15/02* (2006.01)
*E04F 15/10* (2006.01)

(52) U.S. Cl.
CPC ............... *B32B 5/18* (2013.01); *B32B 5/245* (2013.01); *B32B 27/12* (2013.01); *B32B 27/304* (2013.01); *E04F 15/02038* (2013.01); *E04F 15/107* (2013.01); *B32B 2255/10* (2013.01); *B32B 2262/101* (2013.01); *B32B 2266/0235* (2013.01); *B32B 2307/4026* (2013.01); *B32B 2307/412* (2013.01); *B32B 2307/414* (2013.01); *B32B 2471/00* (2013.01); *E04F 2201/0153* (2013.01); *E04F 2201/023* (2013.01); *E04F 2201/042* (2013.01); *E04F 2201/043* (2013.01)

(58) Field of Classification Search
CPC .......... E04F 2201/0107; E04F 2201/03; E04F 2201/0552; E04F 2201/023; E04F 2201/0535; E04F 2201/0146; E04F 2201/043; E04F 2201/0547; E04F 2201/0153; E04F 2201/0138; E04F 15/105; E04F 2201/0161; B32B 5/022; B32B 7/023; B32B 5/245; B32B 3/06; B32B 27/304; B32B 27/08; B32B 5/18; B32B 2471/00; B32B 2262/101; B32B 2266/0235

See application file for complete search history.

(56) References Cited

U.S. PATENT DOCUMENTS

| | | | |
|---|---|---|---|
| 9,624,678 | B2 | 4/2017 | Segaert et al. |
| 9,758,973 | B2 * | 9/2017 | Segaert ............ E04F 15/02038 |
| 10,392,813 | B2 * | 8/2019 | Lombaert ............ E04F 15/107 |
| 10,677,275 | B1 | 6/2020 | Caselli et al. |
| 10,988,939 | B2 | 4/2021 | Van Vlassenrode et al. |
| 11,325,347 | B2 * | 5/2022 | Van Vlassenrode ...... B32B 5/18 |
| 11,565,501 | B2 * | 1/2023 | Van Vlassenrode .... B32B 3/263 |
| 2004/0209007 | A1 | 10/2004 | Satake et al. |
| 2006/0172129 | A1 | 8/2006 | Kanayama et al. |
| 2013/0104485 | A1 | 5/2013 | Meersseman et al. |
| 2015/0197943 | A1 | 7/2015 | Ziegler et al. |
| 2016/0083965 | A1 | 3/2016 | Baert et al. |
| 2019/0136516 | A1 | 5/2019 | Hughes et al. |
| 2020/0215799 | A1 | 7/2020 | Hedlund et al. |
| 2021/0078279 | A1 | 3/2021 | Giannazzo et al. |

FOREIGN PATENT DOCUMENTS

| | | |
|---|---|---|
| WO | 2011129757 A1 | 10/2011 |
| WO | 2013026559 A2 | 2/2013 |
| WO | 2013178561 A2 | 12/2013 |
| WO | 2013179261 A1 | 12/2013 |
| WO | 2014006593 A1 | 1/2014 |
| WO | 2014065953 A1 | 5/2014 |
| WO | 2017046693 A1 | 3/2017 |
| WO | 2018087638 A1 | 5/2018 |
| WO | 2018093098 A1 | 5/2018 |

* cited by examiner

FLOOR PANEL AND METHOD FOR MANUFACTURING A FLOOR PANEL

TECHNICAL FIELD

The present invention relates to floor panels and methods for manufacturing said floor panels.

BACKGROUND OF THE INVENTION

The invention relates more particularly to a floor panel with a substrate and a decoration applied thereon. Floor panels of this kind are widely known per se for example in the form of MDF or HDF panels with a printed decoration, such as the laminate panels in WO 97/47834, in the form of vinyl panels, such as in WO 2013/026559, or in the form of so-called WPC (Wood Plastic Composite) panels with a vinyl top layer, such as in WO 2014/065953.

In the case of WO 2013/026559 they are waterproof floor panels with a substrate of soft or flexible polyvinyl chloride or PVC. In addition, the decoration and the PVC finishing layer applied on top of it offer pleasant walking comfort without a pronounced tapping noise, such as may certainly be the case with laminate panels. However, with the floor panels from WO'559 there is a risk of "telegraphing" effects. The result is that with the passage of time, irregularities in the substrate become visible on the surface of the floor covering, which is unattractive. Furthermore, floor panels of this kind are relatively difficult to install, because they easily bend or deform, owing to the flexibility of the carrier. The soft substrate is susceptible to dimensional changes with temperature fluctuations. Problems may arise with local warming of the floor covering, for example under direct sunlight near a window. Expansion of the elements may occur at these points. The limited stiffness of the floor panels means that the floor covering may camber locally. Any coupling means that are present, such as a locking tongue-and-groove, display only limited strength. The soft finishing layer is susceptible to scratching and staining, even when a UV-cured varnish surface coat is also applied on top of the PVC finishing layer. A varnish surface coat of this kind is of limited effectiveness, since it might well have already worn away in the initial years of use.

WO 2013/026559 to some extent offers a solution for the problems with the dimensional stability of a substrate of flexible PVC. By using a reinforcing layer impregnated with PVC, more particularly a glass-fibre mat impregnated with flexible PVC, with a weight of 65 grams per square metre, improved interaction is obtained between the substrate and the glass-fibre layer, as well as a limited improvement in dimensional stability with temperature fluctuations.

WO 2014/006593 relates to floor panels with a substrate of extruded plastic composite with a finishing layer, for example a vinyl top layer, as decoration. The plastic composite may for example be obtained from on the one hand high-density polyethylene (HOPE), or PVC, and on the other hand bamboo, wood and/or cork material. The substrate is rigid and gives a reduced risk of the aforementioned telegraphing effects. In addition, optional coupling parts may be provided in this stronger substrate. However, extruded substrates of this kind tend to deform or bend, and the dimensional stability is at the same level as the vinyl panels from the aforementioned WO'559.

SUMMARY OF THE INVENTION

The present invention relates firstly to an alternative floor panel, wherein according to the preferred embodiments a solution is offered for one or more problems with the floor panels from the prior art.

According to a first aspect, a floor panel is provided, said floor panel comprising at least one top layer and a substrate, wherein the substrate comprises at least one first layer of a first thermoplastic material and a second layer of a second thermoplastic material, wherein the second layer is adjacent to a first side of the first layer and the second layer provides the floor panel with its underside, characterized in that the first layer is characterized by a first colour with a saturation value S1 in the HSL colour space and the second layer is characterized by a second colour with a saturation value S2 in the HSL colour space, wherein S1 is less than S2.

The top layer provides the panel with its upper side. The substrate is located beneath the top layer.

The first layer and the second layer of the substrate are thus in contact with each other on one side, i.e. in direct contact, wherein one side of the first layer touches one side of the second layer. The first and the second layer of the substrate, as well as optional further layers of the substrate, preferably have a thickness that is uniform over the whole layer.

The HSL colour space means the cylindrical representation of colours based on H being the shade or "hue", which is given as an angle between 0° and 360° (with 0° being primary red, 120° primary green and 240° primary blue), S being the saturation value (or saturation), which varies between 0 and 100, wherein S=0 is no saturation and S=100 is complete saturation, and the L value being the brightness (or lightness or luminance), which varies between 0 and 100, wherein L=0 represents black and L=100 represents white.

According to some embodiments the absolute value of S1−S2 (|S1−S2|) is greater than or equal to 15.

The absolute value of this difference in saturation value (|S1−S2|) is preferably greater than or equal to 20, more specifically greater than or equal to 25.

According to some embodiments S1 is greater than or equal to 15.

The saturation value S1 is preferably less than or equal to 85, more specifically less than or equal to 75. The saturation value S2 is preferably less than or equal to 85, more specifically less than or equal to 75. The saturation value S2 is preferably greater than or equal to 15.

According to some embodiments the first colour has a luminance value L1 in the HSL colour space, L1 being less than or equal to 85.

According to some embodiments the second layer has a luminance value L2 in the HSL colour space and L2 is less than or equal to 85.

Preferably the luminance values L1 and L2 are less than 75, or even less than 50.

Preferably the luminance values L1 and L2 are greater than 15, or even greater than 20.

According to some embodiments the hue of the first colour is characterized by an angle H1 in the HSL colour space and the hue of the second colour is characterized by an angle H2 in the HSL colour space, the smaller angle between H1 and H2 being greater than or equal to 25°.

The smaller angle between H1 and H2 is preferably greater than or equal to 50°, or even greater than or equal to 75°.

According to some embodiments the thermoplastic material of the first layer is PVC.

According to some embodiments the thermoplastic material of the second layer is PVC.

For each of the thermoplastic PVC (polyvinyl chloride) materials of the first and of the second layer, independently of one another, the PVC material may be provided with plasticizers, for example an amount of less than 12 phr of the thermoplastic material may be plasticizers, for example between 1 and 6 phr. For example, independently of one another, the PVC material may be provided with plasticizers; an amount of less than 20 wt % of the thermoplastic material may be plasticizers, for example between O and 15 wt %. The plasticizers may among other things be esters of carboxylic acids (for example esters of iso- or terephthalic acid, trimellitic acid and adipic acid), for example diisononyl phthalate (DINP), dioctyl terephthalate (DOTP), diisononyl-1,2-cyclohexanedicarboxylate (DINCH), esters of phosphoric acid, for example triaryl- or trialkylaryl phosphates, for example tricresyl phosphate, chlorinated or unchlorinated hydrocarbons, ethers, polyesters, polyglycols, sulphonamides, or combinations thereof.

In an alternative embodiment, one of the two PVC layers does not have any plasticizers, and is thus plasticizer-free. In yet another alternative embodiment, both the first layer and the second layer are made of plasticizer-free PVC. The aforementioned percentage by weight (wt %) is expressed as the weight of the element relative to the weight of the thermoplastic material in which the element is located.

For each of the thermoplastic PVC materials of the first and second layer, independently of one another, the PVC material may be provided with fillers, for example an amount of at least 30 phr of the thermoplastic material may be fillers. Fillers may be, among other things, glass fibres, calcium hydroxide (slaked lime), calcium carbonate and calcium hydrogen carbonate, talc, or also light-weight fillers such as hollow microspheres (Expancel). The aforementioned percentage by weight (wt %) is expressed as the weight of the filler relative to the weight of the thermoplastic material in which the filler is located.

For each of the thermoplastic PVC materials of the first and second layer, independently of one another, the colour of the thermoplastic material may be provided with one or more organic or inorganic dyes or organic or inorganic pigments, for example carbon black pigment, which often largely determines the luminance value.

According to some embodiments, at least one reinforcing element is provided at least in one of the first and second layer, or between the first and second layer.

Said reinforcing element may for example be glass-fibre cloth, for example woven or non-woven glass-fibre cloth. Said cloth may have a weight per unit area of at least 30 g/m2 but preferably a weight per unit area of less than 100 g/m2. The weight per unit area is preferably between 35 and 75 g/m2, for example such as between 35 and 65 g/m2, for example such as 50 g/m2.

Both the first and the second layer may be provided with at least one reinforcing element individually.

If several reinforcing elements are provided, for example several said glass-fibre cloths, then the combined weight per unit area for these elements per unit area of the floor panel is preferably less than 150 g/m2.

According to some embodiments, at least one of the first layer and second layer is a chemically or mechanically foamed layer. Preferably the first layer is foamed and the second layer is not foamed.

A foamed layer means a layer that contains hollow spaces, preferably in an amount such that the density of the material is reduced by at least 10%, and preferably even at least 25% relative to the weight of an identical volume of thermoplastic material without hollow spaces. Preferably it relates to so-called "closed-cell" foam. Non-foamed layer means a layer without hollow spaces, or at most with a proportion of hollow spaces such that the density of the material does not decrease, or not more than 10%, and preferably even not more than 2%.

In general it should also be noted that, in the context of the invention, a foamed layer need not necessarily be foamed in a uniform manner. It is possible that the foamed layer comprises a proportion of hollow spaces that varies through its thickness. Thus, for example, the highest proportion may be reached at the centre of the layer, whereas on one or more of the surfaces of such a layer there may be zones that are less foamed or even are not foamed.

The foamed layer may be obtained in various possible ways, the three main possibilities being enumerated hereunder.

According to a first possibility, the foamed layer is obtained at least by means of a mechanical foaming process. This signifies that in the layer in question, cavities are formed by pushing the thermoplastic material away and replacing it with a gas (for example air), often under the influence of mechanical action or by blowing-in a gas (for example air) under pressure. Or it may be obtained by using expanding granules in a PVC-based layer.

According to a second possibility the foamed layer is obtained at least by means of a chemical foaming process. This means that in the layer in question cavities are formed by means of a gaseous reaction product. For example, azodicarbonamide may be used. This substance releases nitrogen gas when heated, and this remains in the form of bubbles in the foamed layer.

According to a third possibility, the foamed layer is obtained at least by means of fillers, wherein these fillers in themselves comprise one or more cavities. It is for example possible to make use of the expanded state of the microspheres mentioned above. More particularly, it is possible to use the microspheres known from WO 2013/178561.

According to some embodiments the substrate of the panel comprises one or more further layers of thermoplastic material, all of which are located on the second side of the first layer in the floor panel, wherein each of the one or more further layers of thermoplastic material is characterized individually by a saturation value Sx.

According to some embodiments, for each of the one or more layers, the colour has a saturation value Sx that is less than S2.

According to some embodiments, for at least one of the one or more layers the colour has a saturation value Sx that is equal to S1.

According to some embodiments, each of the one or more further layers of thermoplastic material is characterized individually by a luminance value Lx, wherein each Lx is less than L2.

According to some embodiments, each of the one or more further layers of thermoplastic material is characterized individually by a hue with angle Hx, wherein the smaller angle between H2 and each of the Hx is greater than or equal to 25°.

The smaller angle between H1 and each of the Hx is preferably greater than or equal to 25°.

According to some embodiments the largest of L1 and all Lx is less than or equal to 85.

According to some embodiments the largest of S1 and all Sx is less than or equal to 85.

According to some embodiments, all of the one or more further layers of thermoplastic material are located between the second side of the first layer of thermoplastic material and the upper surface of the floor panel. In other words all of the one or more further layers of thermoplastic material are located between the second side of the first layer of thermoplastic material and the top layer of the panel.

The different layers of thermoplastic material may be produced in various different ways, and may be fastened to one another by means of a thermal lamination process. If the layers of thermoplastic material comprise a foamed layer or layers, they are preferably fastened to the other layer or layers by means of a glued joint.

Preferably, one or more of the thermoplastic layers are obtained by spreading and consolidating at least the aforementioned thermoplastic material whether or not in the form of granules. Processing by spreading for making floor panels is known per se, for example from WO 2013/179261.

The panel further comprises a top layer. According to some embodiments the top layer of the panel comprises a decorating or decoration layer, said decorating layer being located between the layers of thermoplastic material and the upper surface of the floor panel.

According to some embodiments the decoration layer comprises a printed pattern.

According to some embodiments, decoration comprises a thermoplastic film, preferably PVC film. According to some embodiments the film is provided with a decorative print. According to some embodiments the printed pattern is an ink-jet-printed pattern. According to some embodiments the printed pattern is an ink-jet-printed pattern that is printed on the upper side of the uppermost of the first, second or one of the several layers of thermoplastic material.

If applicable, the upper side of the uppermost of the first, second or one of the several layers of thermoplastic material is provided with a priming coat, for example obtained on the basis of a white PVC plastisol.

Preferably the printed pattern is a pattern of wood grain and/or stone. Preferably the floor panel shows the pattern of just one wooden board.

Although the preference is for printed patterns, it is not excluded that the decoration could be formed by for example real wood veneer or real stone veneer, or by a consolidated mixture of powders, for example PVC powders or PVC granules.

According to some embodiments the top layer of the panel further comprises a transparent or translucent wearing layer, applied on the decorating layer.

According to some embodiments the panel further comprises a transparent or translucent wearing layer applied on the decoration layer.

Preferably said wearing layer consists essentially of thermoplastic material, preferably PVC, for example with a thickness between 0.15 and 0.75 millimetre.

According to some embodiments the wearing layer comprises a varnish coat adjacent to the surface.

Examples of usable varnish coats are varnish coats based on urethane acrylates, polyester acrylates and/or epoxide acrylates. Preferably they are varnish coats that are cured using UV radiation or excimer radiation. The varnish coat in question may comprise hard particles, for example of aluminium oxide and/or silica for obtaining increased wear resistance.

According to some embodiments the panel is provided with a relief on its upper surface.

If a decoration layer has been provided, the relief may relate to the pattern that is shown in the decoration layer. The relief is then in register with the pattern.

The floor panel may thus comprise a wearing layer, a coating and two or more thermoplastic layers, as well as an undercoat that provides the underside of the floor panel with functionalities. All layers that are located between the underside of the floor panel and the decoration layer, thus including the layer that is provided on the underside, form part of the substrate.

If the floor panel comprises one or more foamed layers, these foamed layers preferably provide at least 30% of the thickness of the substrate, and preferably even 40% or more. Preferably this foamed layer or these foamed layers provide 30 to 70% of the thickness of the floor panel, and 25 to 65% of the thickness of the substrate. Preferably the foamed layer or layers are located centrally in the substrate.

The floor panels of the invention may preferably be used for making a floating floor covering. For this purpose they may be provided on one or more edges with profiling. The layered structure of the floor panels of the invention may display various synergistic effects with the concrete design of said profiling. A number of preferred characteristics of said profiling are stated hereunder.

According to some embodiments, the floor panel in question is provided, on at least two opposite edges, with coupling means that allow two such floor panels to be coupled together, wherein on the edges in question, locking is brought about at least in a vertical direction (V) perpendicular to the surface of the panels, wherein at least one of the aforementioned edges is provided with a groove, which is located entirely above the aforementioned second layer.

According to some embodiments, the floor panel in question is provided, on two edges adjacent to one another, with a groove that is located above the aforementioned second layer.

The floor panels according to the invention have the advantage that in their production, the second layer may provide a quality function of the production equipment. The coupling means is normally provided by milling and sawing. If the milling cutters function correctly, the grooves are cut out in the layers above the second layer (which is often the lowest layer of the floor panel). If the milling cutter does not function well, parts of the second layer may become visible. The production equipment may be provided with a detector, to generate a signal once the colour of the second layer is visible on a floor panel, viewed from the upper side of the floor panel. The lateral edges of the floor panels are often provided by cutting the floor panels out of or from a larger whole. Once again, with vertical cutting, the colour of the second layer will not be visible. If the cut surfaces are inclined in towards the floor panel, or the cut surface is not measured correctly, the colour of the second layer may be visible.

According to a second aspect of the invention, a method is provided for making a floor panel, said method comprising the steps:
  making a floor panel according to one of the preceding claims, comprising at least providing the edges of the panel by cutting the edge and/or milling a coupling means on at least one of the edges;
  by means of an optical detector, detecting the second layer by detection that is substantially vertical to the upper surface of the panel;
  generating a signal if the optical detector detects the second layer.

Although the colour differences may be detected with any suitable optical system, the values H, S and L are measured with a spectrophotometer, for example Datacolor 500. The settings selected for colour measurement are light source D65 and diffuse light, measurement at an angle of 10° with 30 mm aperture (LAV), with white background and without taking into account gloss or structural difference Reflectance Specular Included (RSIN)).

According to some embodiments the detector is a camera. According to some embodiments the camera is a line camera. According to some embodiments the camera is a colour camera.

According to some embodiments the signal is supplied to a process control system. According to some embodiments the process control system will link the signal to an error message. According to some embodiments the process control system will generate an output signal linked to the error message.

The process control system can interpret the signal and link it to the cause of appearance of the second layer on the front of the panel. The process control system can optionally generate an output signal which operates or adjusts one or more of the machines so that the second layer is no longer present, or it can supply the operator with information to enable him or her to take the appropriate measures to correct the fault and prevent further occurrence. Thus, for example the presence of the second layer may be linked to a set of worn milling cutters or cutting blades or to an error in the positioning of one or more milling cutters or cutting blades relative to the panel being processed. If the layers are provided by a spreading installation for spreading thermoplastic particles in layers, which are then formed under temperature and pressure into a layered structure of thermoplastic materials, the process control system may optionally supply information to the machine or operator in connection with faults in this spreading installation.

The independent and dependent claims present specific and preferred features of the embodiments of the invention. Features of the dependent claims may be combined with features of the independent and dependent claims, in any suitable manner that would be obvious to a person skilled in the art.

The aforementioned and other features, properties and advantages of the present invention will be explained by means of the following examples of embodiments, optionally in conjunction with the drawings.

The description of these embodiment examples is given as an explanation, without the intention of limiting the scope of the invention. The reference numbers in the description given hereunder refer to the drawings. The same reference numbers in different figures refer to identical or equivalent elements.

BRIEF DESCRIPTION OF THE FIGURES

For better demonstration of the features of the invention, some preferred embodiments are described hereunder, as examples without any limiting character, referring to the appended drawings, in which.

DETAILED DESCRIPTION OF THE INVENTION

The present invention is described below on the basis of specific embodiments.

It should be pointed out that the term "comprising", as used for example in the claims, is not to be interpreted in a limiting sense, limiting to the elements, features and/or steps that then follow. The term "comprising" does not exclude the presence of other elements, features or steps.

Thus, the scope of an expression "an object comprising the elements A and 8" is not limited to an object that only contains the elements A and 8. The scope of an expression "a method comprising the steps A and 8" is not limited to a method that only contains the steps A and 8.

In the light of the present invention, these expressions only signify that the relevant elements or steps for the invention are the elements or steps A and 8.

In the following specification, reference is made to "an embodiment" or "the embodiment". Such a reference signifies that a specific element or feature, described on the basis of this embodiment, is comprised in at least this one embodiment.

The occurrence of the terms "in an embodiment" or "in the embodiment" at various points in this description does not, however, necessarily refer to the same embodiment, although it may well refer to one and the same embodiment.

Moreover, the properties or the features may be combined in any suitable manner in one or more embodiments, as would be obvious to a person skilled in the art.

Figure 1:
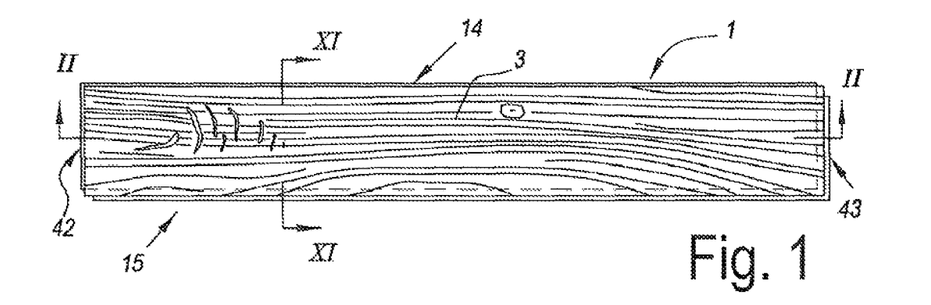
FIG. 1 shows a floor panel with the features of the invention.

FIG. 1 shows a rectangular floor panel 1.

Figure 2:
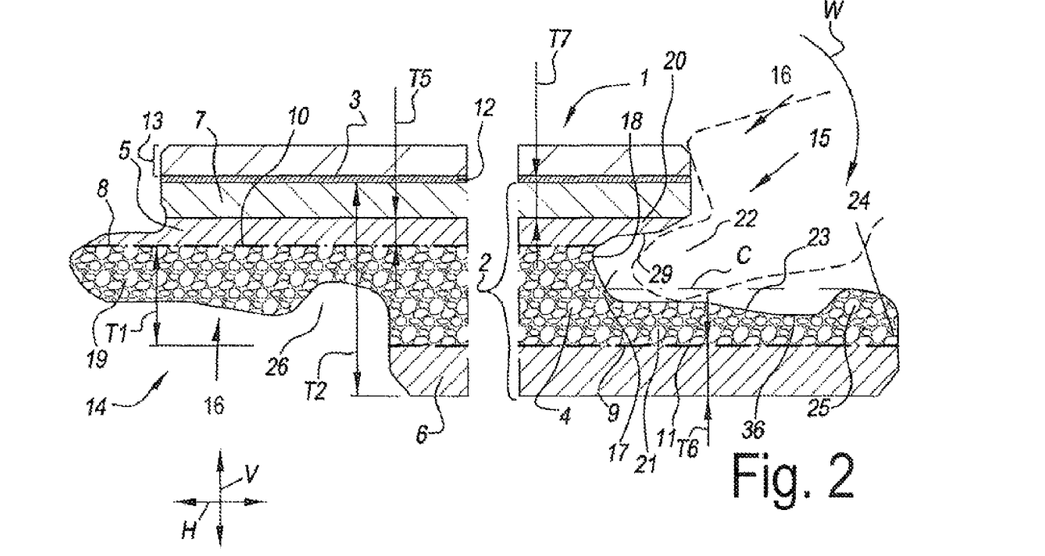
FIGS. 2 to 4 show, on a larger scale, a section along line 11-11 or XI-XI indicated in FIG. 1.

FIG. 2 clearly shows that the floor panel 1 comprises a substrate 2 and a decoration 3 applied thereon. Together with the wearing layer 13, this decoration 2 forms the top layer of the floor panel. FIG. 2 is a cross-section along section XI-XI.

The substrate 2 comprises a first layer, in this case a foamed layer. 4 made of thermoplastic material, in this case polyvinyl chloride (PVC). This foamed layer 4 is positioned in such a way that it is located at least centrally in the substrate 2, namely on the centre line C. In this case the thickness T1 of the foamed layer represents more than 40% of the thickness T2 of the substrate. The substrate further comprises a second, in this case non-foamed, layer 6. Otherwise the substrate 2 further comprises non-foamed layers 5 and 7. The second layer 6 provides the floor panel with its underside.

The substrate 2 of the floor panel 1 from the example in FIGS. 1 and 2 comprises a first and a second reinforcing layer 8-9, in this case glass-fibre layers, more particularly glass-fibre mats (non-woven). A first reinforcing layer 8 is located on the surface 10 of the foamed layer 4 facing the decoration 3 and, together with the second reinforcing layer 9, encloses the foamed layer 4. The aforementioned second reinforcing layer 9 is in this case located on the opposite surface 11 of the foamed layer 4.

The aforementioned decoration 3 comprises a printed pattern and shows a single wooden board. The printed pattern is applied on a thermoplastic film 12, namely a PVC film. The floor panel 1 has in addition a translucent or transparent wearing layer 13 that is applied on top of the aforementioned decoration 3.

The aforementioned non-foamed layers 5-6-7 comprise, in the example, a non-foamed layer 5 and a non-foamed layer 6, which in each case are next to the aforementioned surfaces 10-11 of the foamed layer 4, and, in this case, also next to the reinforcing layers 8-9. These non-foamed layers 5-6 consist of the same thermoplastic material, namely PVC, as the foamed layer 4, but preferably comprise a higher content of fillers, such as lime or talc. The floor panel in FIG. 2 represents an example of a substrate 2, wherein said non-foamed layers 5-6 enclose the foamed layer 4.

The substrate 2 in FIG. 2 further comprises a non-foamed layer 7 of thermoplastic material. This non-foamed layer 7 is located between the decoration 3 and the aforementioned first non-foamed layer 5, and has a plasticizer content that is greater than the plasticizer content optionally present in the foamed layer 4 and/or is greater than the plasticizer content optionally present in the non-foamed layer 5-6.

The non-foamed layer 6 is attached to the lower surface 11 of the foamed layer 4, and the second non-foamed layer 6 is made thicker than the aforementioned non-foamed layer 5 on the upper surface 10 of the foamed layer 4, for example with a thickness T6 greater than 1.5 times the thickness TS of the non-foamed layer 5. The sum of the thickness TS of the non-foamed layer 5 and the thickness T7 of the third non-foamed layer 7 is preferably roughly equal, greater than or equal to the thickness T6 of the nonfoamed layer 6, preferably at least 10% greater, but less than 50% greater. In this way, the second foamed layer 6 can optimally withstand any residual stresses in the nonfoamed layer 5-7.

The colours of the layers 4, 5, 6 and 7 of a first embodiment A are given in Table I on the basis of the luminance value L, the saturation value S and the hue H.

| Layer/Colour | CIE Lab | | | HSL | | | |
|---|---|---|---|---|---|---|---|
| | L | a | b | H | S | L | |
| 7 | 27.89 | 0.16 | 0.2 | 0.00 | .76 | 25.69 | Further Layer |
| 5 | 30.46 | 0.11 | 0.11 | 0.00 | 0.00 | 27.84 | Further Layer |
| 4 | 44.08 | −0.41 | −2.33 | 210.00 | 2.88 | 40.78 | First Layer |
| 6 | 37.73 | 30.76 | 12.32 | 357.63 | 34.63 | 40.20 | Second Layer |

It is clear that the saturation value S2 of the second layer is much greater than that of all other layers, especially the first layer 4. The difference in saturation value between the first and second layer is 31.75

The second layer is then also an especially lighter red layer with relatively high L value, whereas the other layers are rather darker layers with low luminance.

In alternative embodiments the layer 4 is a non-foamed PVC layer.

The floor panel 1 from the example is provided at least on the two opposite long edges 14-15 with coupling means 16 which allow two such floor panels 1 to be coupled together, wherein, as shown in FIG. 2, locking is brought about on the edges 14-15 in question. For this purpose, panel 1 is provided on at least one of its long edges 15 with a groove 17, wherein the deepest point 18 of this groove 17 is located in the aforementioned foamed layer 4. The groove 17 is, in this case, provided for interacting with a tongue 19 on the opposite edge 14, and is delimited by an upper lip 20 and a lower lip 21, wherein the lower lip 21 extends in the distal direction beyond the upper lip 20, or in other words beyond the groove opening 22. FIG. 2 shows that the tongue 19 can be fitted in the groove 18 by means of a rotating movement W round said edges 14-15.

The groove 17 is made completely above the second layer 6 and is thus located above the second layer.

The upper surface 23 of the lower lip 21 is in this case formed entirely from the material of the aforementioned foamed layer 4, and the lower lip 21 is provided near its distal end 24 with a hook-shaped locking part 25, which in this case also consists entirely of material of the foamed layer 4. The hook-shaped part 25 is intended to interact, in the coupled state, with a locking groove 26 on the underside of the edge 14 that is provided with the aforementioned tongue 19, and brings about the aforementioned locking in the horizontal direction H. For this purpose, a pair of horizontal active contact surfaces 27-28 is formed between the aforementioned hook-shaped part 25 and the locking groove 26. The contact surfaces 27-28 are formed on the material of the foamed layer 4.

In the example, the lower surface 29 of the upper lip 20 is formed almost completely in layer 5, i.e. in a part of the substrate 2 that is free from the aforementioned foamed layer 4. In this way, surface 36 is made entirely from material of layer 4, and thus no material of the second layer is visible here on the surface 36.

One of the reinforcing layers 9 extends continuously in the aforementioned lower lip 21, whereas the second of the aforementioned reinforcing layers 8 extends in the material of the aforementioned tongue 19. In this way, parts of material that project on the edges 14-15 are provided with extra support. The presence of a part of a non-foamed layer 5-6-7 both in the tongue 19 and in the lower lip 21 is also advantageous. The stability of the upper lip 20 is assured by the non-foamed layers 5-7 present there.

The foamed layer 4, as well as the non-foamed layer 5-6 are free from plasticizer or comprise a plasticizer content less than 12 phr. The non-foamed layer 7 also has a plasticizer content less than 12 phr. Thus, the substrate 2 consists entirely of layers 4-5-6-7 with a plasticizer content less than 12 phr, even if plasticizer were to be present in said layers 4-5-6.

The layers of the substrate 2 shown here are fastened to each other by a thermal laminating process. The foamed layer 4 and the non-foamed layers 5-6 are obtained by spreading and consolidating thermoplastic material, whether or not in the form of granules or so-called dry blend.

Figure 3:
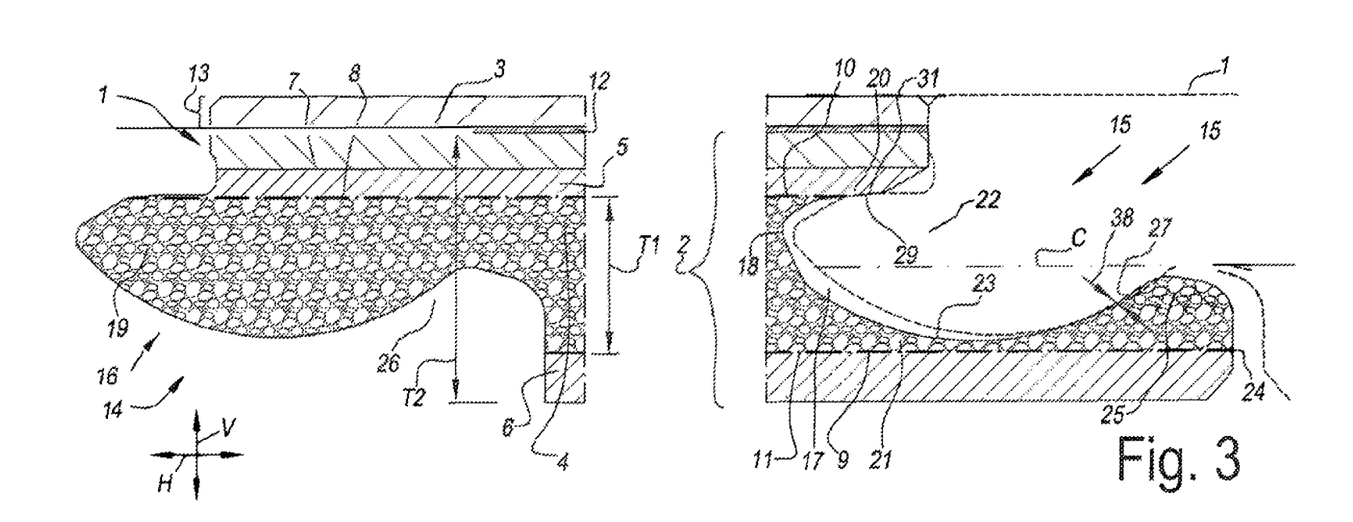

FIG. 3 shows an example in which the substrate 2 is structured similarly to FIG. 2, but on sides 14 and 15 there is a tongue and groove with a slightly different shape. Here too, the groove is located completely above the second layer 6. FIG. 3 is a cross-section along section 11-11 of the panel in FIG. 1.

Figure 4:
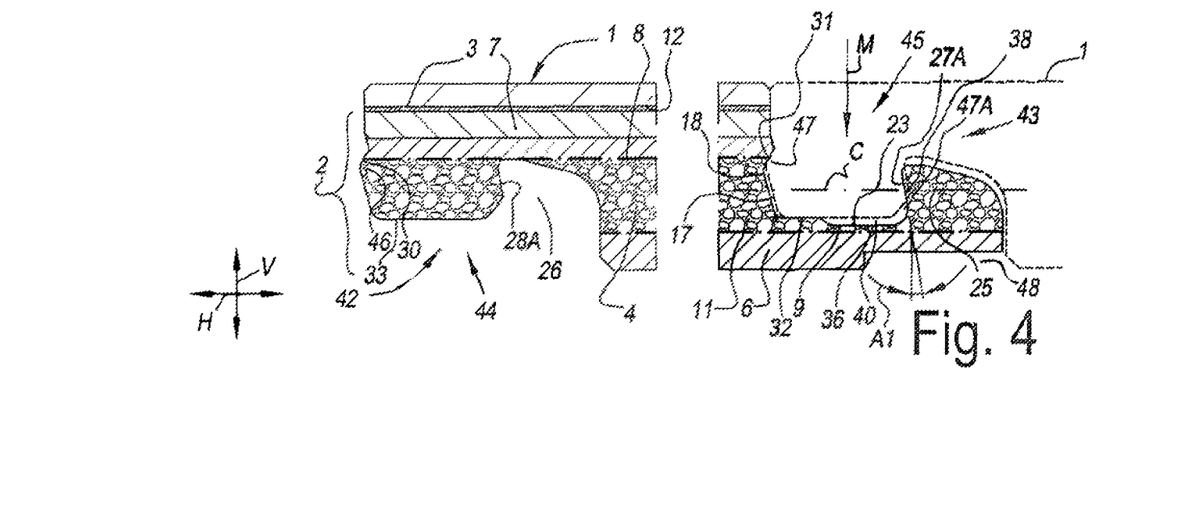

FIG. 4 shows the short edges 42-43 of the floor panel 1 from FIGS. 1 to 3. In this case edge profiling is applied with a male part 44 and a female part 45, allowing two such floor panels 1 to be coupled on said edges 42-43 by means of a downward movement M of the male part 44 into the female part 45, wherein, in the coupled state, locking is brought about both in a horizontal direction H and in a vertical direction V. The combination of a rotatable profile on the long edges 14-15, for example according to one of FIG. 2 or 3, and a downward coupling profile on the short edges 44-45, for example according to FIG. 4, gives rise to a floor panel 1 that can be coupled by a so-called folddown movement. The long edges 14-15 are fitted together with a rotating movement W, and through this rotating movement W, a downward movement M arises on the short edges 42-43, which fits the male part 44 in the female part 45.

The example presented here of this downward coupling profiling is produced on the one hand with the material of the floor panel 1 and comprises, for bringing about locking, an interacting snap hook 46 and undercut 47, as well as a hook-shaped part 25 on the lower lip 21, which in this case also has an undercut 47A. The undercut 47A on the hook-shaped part 25 is made in such a way that it makes an angle A 1 with the vertical of 1° to 10°, and preferably about 5°. The locking groove 26 that interacts with the aforementioned hook-shaped part 25 is positioned entirely underneath the reinforcing layer 8 on the upper surface 10 of the foamed layer 4.

The aforementioned interacting snap hook 46 and undercut 47 in this case have, in the coupled state, interacting vertical active contact surfaces 30-31, which are made partly in the foamed layer 4 and partly in the non-foamed layer 5 located above it. The horizontal and vertical active contact surfaces 27-28 of the hook-shaped part 25 are made entirely of the material of the foamed layer 4. The female part 45 is then also made completely above the second layer 6.

The upper surface 23 of the lower lip 21 consists entirely of material of the foamed layer 4. In the coupled state the edge profiling has vertical active contact surfaces 32-33 formed on this upper surface 23. There is a space 40 between these vertical active contact surfaces 32-33 and horizontal active contact surfaces 27 A-28A. The bottom reinforcing layer 9 extends as a single piece into the lower lip 21, and the top reinforcing layer 8 extends as a single piece over the aforementioned locking groove 26.

On the underside of the lower lip 21, a recess 48 is made, which extends at least partially under the aforementioned space 40. This ensures smoother coupling, even with the overlap 38 shown in the contours.

Thus, the floor panels as presented in FIGS. 1 to 4, viewed from above, do not have, in any place at all, material of the second layer on the surface. The edges, tongues and grooves are formed from flat boards by milling and cutting. If one or more of these cutting movements are carried out incorrectly, for example milled too deep or not cut vertically but cut with a cutting blade that is inclined towards the centre of the plate, or if the second layer is made too thick, material of the second layer will be visible on the upper surface of the panels after processing.

During production it is possible to check by visual or optical inspection, for example based on a detection system, for example a colour camera, whether material with the brighter colour of the second layer is visible along the upper side of the panel. If this is so, this detection system can generate a signal, for example an electrical or optical signal can be supplied to a process control system, for example a processing unit of such a process control system. This system can generate an output signal linked to the error message that was given. For example it is possible to check where on the panel the colour of the second layer was detected, and which process step might be its cause. The output signal from the processing system may be a control signal to the machine that is operating incorrectly, or the operator can receive information from this output system showing which process step is taking place incorrectly, for example which milling cutter or cutting blade is operating incorrectly.

It is clear that although the embodiments and/or the materials for implementing embodiments according to the present invention have been discussed, various changes or alterations may be applied without departing from the scope and/or the spirit of the present invention. The present invention is by no means limited to the embodiments described above, but may be implemented according to different variants while remaining within the scope of the present invention.

The invention claimed is:

1. A floor panel comprising at least one substrate and a top layer, said substrate comprising at least one first layer of a first thermoplastic material and a second layer of a second thermoplastic material, wherein the second layer is adjacent to a first side of the first layer, wherein the first layer is characterized by a first colour with saturation value S1 in a HSL (Hue, Saturation, Lightness) colour space and the second layer is characterized by a second colour with saturation value S2 in the HSL colour space, wherein S1 is less than S2.

2. The floor panel of claim 1, wherein said floor panel comprises an additional layer on an underside of the floor panel.

3. The floor panel of claim 2, wherein said additional layer forms part of said substrate.

4. The floor panel of claim 2, wherein said additional layer is an undercoat that provides the underside of the floor panel with functionalities.

5. The floor panel of claim 1, wherein said floor panel comprises one or more foamed layers.

6. The floor panel of claim 5, wherein said foamed layers contain hollow spaces, in an amount such that the density of the material is reduced by at least 10%.

7. The floor panel of claim 5, wherein said foamed layers are located centrally in the substrate.

8. The floor panel of claim 1, wherein said first thermoplastic material is polyvinyl chloride (PVC).

9. The floor panel of claim 8, wherein said polyvinyl chloride (PVC) material is provided with fillers.

10. The floor panel of claim 9, wherein said fillers are present in an amount of at least 30 phr (parts per hundred) of the thermoplastic material.

11. The floor panel of claim 1, wherein the absolute value of S1-S2 is greater than or equal to 15.

12. The floor panel of claim 1, wherein S1 is greater than or equal to 15.

13. The floor panel of claim 1, wherein the first colour has a luminance value L1 in the HSL colour space and L1 is less than or equal to 85.

14. The floor panel of claim 1, wherein the second layer has a luminance value L2 in the HSL colour space and L2 is less than or equal to 85.

15. The floor panel of claim 1, wherein the hue of the first colour is characterized by an angle H1 in the HSL colour space and the hue of the second colour is characterized by an angle H2 in the HSL colour space and where the smaller angle between H1 and H2 is greater than or equal to 25°.

16. The floor panel of claim 1, wherein the top layer of the panel comprises a decorating layer, said decorating layer being located between the layers of thermoplastic material and an upper surface of the floor panel, wherein the decorating layer comprises a printed pattern.

17. The floor panel of claim 16, wherein the decorating layer comprises a thermoplastic film, wherein the film is provided with a decorative print.

18. The floor panel of claim 16, wherein the top layer of the panel further comprises a transparent or translucent wearing layer applied on the decorating layer.

19. The floor panel of claim 1, wherein the top layer of the panel is provided with a relief on an uppermost surface of the top layer.

20. The floor panel of claim 1, wherein the floor panel is provided on at least two opposite edges with coupling means that allow two such floor panels to be coupled together, wherein locking is brought about on said edges at least in a vertical direction perpendicular to the surface of the panels, wherein at least one of said edges is provided with a groove is located entirely above the second layer.

21. A floor panel comprising at least one substrate and a top layer, said floor panel comprising one or more foamed layers,
wherein said substrate comprises at least one first layer of a first thermoplastic material and a second layer of a second thermoplastic material, wherein the second layer is adjacent to a first side of the first layer,
wherein said first thermoplastic material is polyvinyl chloride (PVC) provided with fillers, wherein said floor panel further comprises an additional layer on an underside of the floor panel, the additional layer forms part of said substrate, wherein the top layer of the panel comprises a decorating layer, said decorating layer being located between the layers of thermoplastic material and the upper surface of the floor panel, wherein the decorating layer comprises a printed pattern, wherein the top layer of the panel further comprises a transparent or translucent wearing layer applied on the decorating layer, wherein the top layer of the panel is provided with a relief on an uppermost surface of the top layer, and wherein the first layer is characterized by a first colour with saturation value S1 in a HSL (Hue, Saturation, Lightness) colour space and the second layer is characterized by a second colour with saturation value S2 in the HSL colour space, wherein S1 is less than S2.

* * * * *